May 14, 1957   J. V. OLSEN   2,792,032
SWINGING POWER SAW
Filed Sept. 30, 1955   2 Sheets-Sheet 1
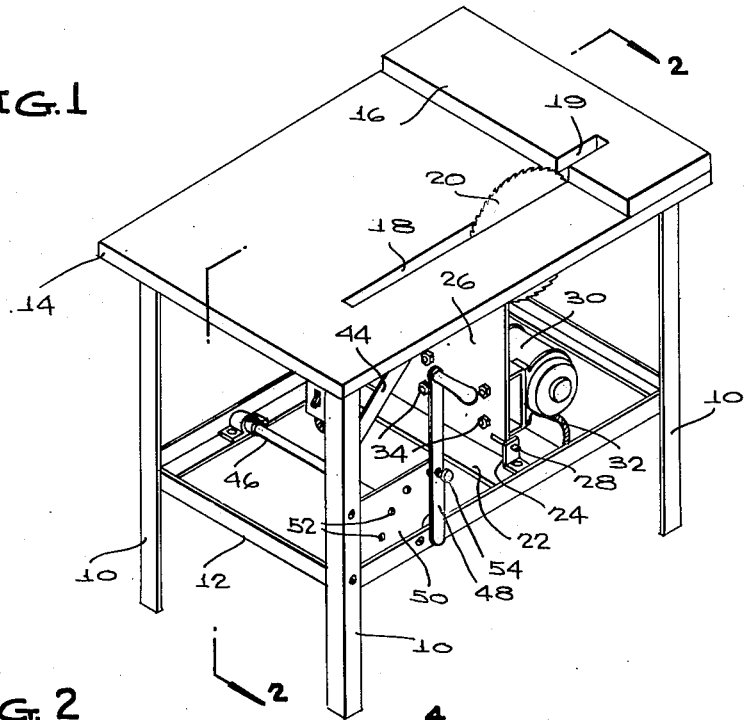
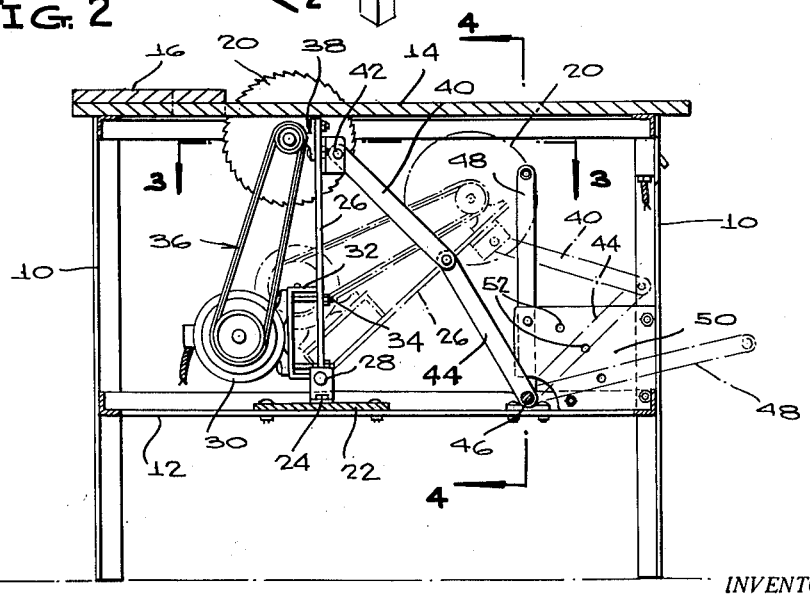
INVENTOR.
JOHN V. OLSEN
BY
McMorrow, Berman & Davidson
ATTORNEYS May 14, 1957   J. V. OLSEN   2,792,032
SWINGING POWER SAW Filed Sept. 30, 1955   2 Sheets-Sheet 2

INVENTOR.
JOHN V. OLSEN
BY
McMorrow, Berman & Davidson
ATTORNEYS

United States Patent Office 2,792,032
Patented May 14, 1957

2,792,032
SWINGING POWER SAW
John V. Olsen, St. Louis, Mo.

Application September 30, 1955, Serial No. 537,684

3 Claims. (Cl. 143—46)

Summarized briefly, this invention is a rotary power saw in which the blade is mounted to swing through a work-traversing arc, between a retracted position below the work support table and a position of maximum extension in close proximity to a work-engaging stop. A toggle linkage is used for swinging a blade-end-carrying plate through the medium of a crank handle lockable in selected positions.

Among important objects are the following:

To improve upon the means for extending and retracting a swinging power saw;

To facilitate the locking of the swinging blade assembly in selected extended positions and in a fully retracted position;

To reduce the possibility of injury to a minimum;

To save space when the saw blade is lowered, due to the resultant provision of a flat table top on which other work operations can be performed;

To extend and retract the saw with maximum speed, responsive to throw of the handle over a comparatively short distance;

To so locate the operator-controlled saw swinging mechanism as to necessitate that the saw cuts away from the user; and To eliminate the necessity of holding the work with both hands.

Other objects will appear from the following description, the claims appended thereto, and from the annexed drawing, in which like reference characters designate like parts throughout the several views, and wherein:

Figure 1 is a perspective view;

Figure 2 is a longitudinal section on line 2—2 of Figure 1;

Figure 3:
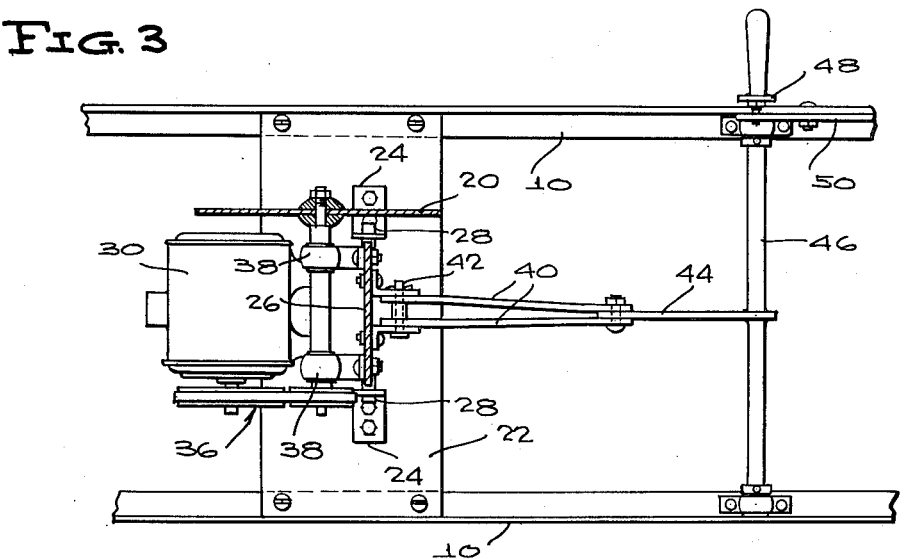
Figure 3 is an enlarged plan section on line 3—3 of Figure 2.

A stationary support frame includes rectangularly spaced, vertical legs 10, braced intermediate their ends by an open, rectangular, horizontal bracing frame 12 fixedly secured at its corners to the several legs. Secured fixedly to and supported upon the upper ends of the legs 10 is a horizontal, rectangular table 14, to which is fixedly connected a wide, flat work stop 16 extending the full width of table 14 at one end of the table. Extending perpendicularly to the length of a stop 16 is a slot-like blade passage 18 and communicating with said passage at one end thereof is a slot 19 formed in and extending transversely of stop 16, to receive a rotary blade 20 when the blade is swung upwardly through passage 18 to traverse the work, not shown.

Secured fixedly at its ends to and extending transversely of bracing frame 12 intermediate the ends of the bracing frame is a horizontal saw blade assembly support-plate 22, on which are mounted upwardly projecting hinge brackets 24 of an L-shape spaced transversely of the bracing frame. A flat, wide plate member 26 is hingedly connected by pins 28 to the brackets 24, for swinging movement about a horizontal axis extending transversely of the device, between the extended, full line and the retracted, dotted line positions shown in Figure 2.

Adjacent the hinge pins 28, a drive motor 30 is spaced from plate member 26 by a motor support plate 32, and passing through the motor support plate and the base of the motor are connecting screws 34 extending through openings of the plate member 26. Motor 30 is connected by a belt and pulley drive 36 to the shaft of saw blade 20, said shaft being journalled in bearings 38 attached to the free end of plate member 26 as shown to best advantage in Figure 3.

Figure 4:
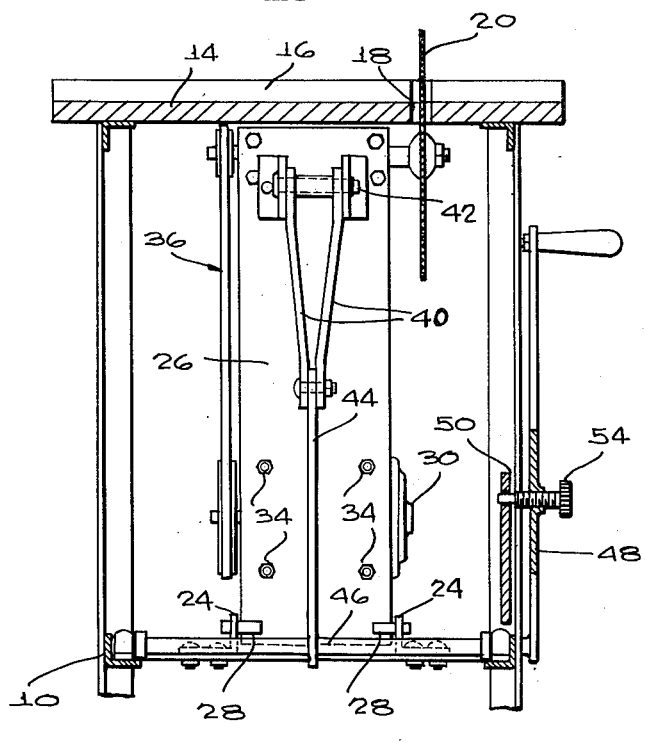
Figure 4 is a transverse section, on an enlarged scale, on line 4—4 of Figure 2.

Means for swinging the saw blade assembly (basically composed of the plate member 26, motor 30, drive means 36 and blade 20) includes a pair of side-by-side links 40 (Figures 2 and 4) pivotally connected at one end by a pin 42 to brackets projecting from plate member 26. Links 40 converge in a direction away from the pivot pin 42, and at their convergent ends receive one end of a second link 44. At their overlapping ends, the links 40, 44 are pivotally connected and together comprise a toggle linkage.

At its other end, link 44, is fixedly secured to the mid-length portion of a rock shaft 46, journalled in bearings carried by the sides of the bracing frame 20. Shaft 46 is fixedly connected at one end to a crank handle 48, disposed at one side of the support frame in close proximity to a vertically disposed lock plate 50. Plate 50 is fixedly secured to the support frame and is formed with an arcuate series of apertures 52 any of which is adapted to receive the reduced inner end of a lock screw 54 threaded in the intermediate portion of handle 48.

If desired, a narrow, elongated metal plate may be mounted upon the table 14, in parallel relation to stop 16, and disposed between blade 20 and that side of table 14 shown at the left in Figure 1. Said plate would be formed with longitudinally spaced openings receiving connecting elements, with said elements being such as to permit removal of the plate whenever desired, should its use in a particular situation as a means cooperating with stop 16 for holding the work not be necessary.

As shown in Figure 2, the blade assembly swings between opposite extreme limits in one of which blade 20 is extended to its maximum extent, with member 26 disposed vertically, and in the other of which member 26 is inclined with blade 20 fully retracted below table 14. Intermediate extended positions are also provided. In the maximum extended position, that aperture 52 farthest to the left in Figure 2 is used to receive screw 54, for locking the assembly in said position. In the full retracted position the lowest aperture 52, which is farthest to the right in Figure 2, is used and in intermediate extended positions apertures 52 disposed intermediate the ends of the series of apertures are used.

In use, the operator stands at the rear end of the table, shown at the left in Figure 1, and the work is engaged against stop 16. Handle 48 is then swung upwardly, causing the blade 20 to travel through an arcuate path out of passage 18 to traverse the work, the blade moving away from the user and thus providing a desirable safety feature. At the same time, the necessity of holding the work with both hands is eliminated, the work remaining stationary while being cut.

A quick response to throw of the handle 48 is achieved through the medium of the toggle linkage, both during extension or retraction of blade 20. Further, when blade 20 is fully retracted, the table top is clear, for performance of other types of work, thus providing a saving in space.

Still further, the motor 30 is so disposed as to be located slightly beyond a dead center in the fully retracted blade position, as will be noted by reference to the dotted line showing of Figure 2. The main portion of the weight of the motor is disposed to the left of hinge axis 28 under these circumstances, so that the weight of the motor aids in the swinging of the blade to a maximum extended position, so as to require minimum effort on the part of the user while the saw blade is traversing the work.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A swinging power saw comprising a support frame; a horizontally disposed work support table mounted upon said frame and having an elongated, slot-like blade passage; a sawing assembly carried by the frame including a swing plate pivotally mounted on the frame for swinging movement about a horizontal axis extending transversely of the frame, a motor mounted on said swing plate, a rotary saw-blade journalled on the swing plate, said blade swinging with the swing plate between an extended position projecting through the blade passage and a retracted position below the table, and a driving connection between the motor and blade; a toggle linkage pivotally connected at one end to the swing plate; a rock shaft journalled in and extending transversely of the frame, said linkage being connected at its other end to said shaft and being adapted to swing the swing plate between blade-extending-and-retracting positions responsive to the rocking of the shaft in respectively opposite directions, the shaft projecting beyond one side of the frame; a fixed plate member rigid with the frame at said side thereof and having an arcuate series of openings curving about the axis of the shaft; a handle rigid with, and secured to the projecting end of the shaft for rocking the same; and a detent on the handle movable into selected openings of said series to hold the swing plate in selected positions of pivotal adjustment thereof.

2. A swinging power saw comprising a support frame; a horizontally disposed work support table mounted upon said frame and having an elongated, slot-like blade passage; a sawing assembly carried by the frame including a swing plate pivotally mounted on the frame for swinging movement about a horizontal axis extending transversely of the frame, a motor mounted on said swing plate, a rotary saw blade journalled on the swing plate, said blade swinging with the swing plate between an extended position projecting through the blade passage and a retracted position below the table, and a driving connection between the motor and blade; a toggle linkage pivotally connected at one end to the swing plate; a rock shaft journalled in and extending transversely of the frame, said linkage being connected at its other end to said shaft and being adapted to swing the swing plate between blade-extending-and-retracting positions responsive to rocking of the shaft in respectively opposite directions, the shaft projecting beyond one side of the frame; a fixed plate member rigid with the frame at said side thereof and having an arcuate series of openings curving about the axis of the shaft; a handle rigid with, and secured to the projecting end of the shaft for rocking the same; and a detent on the handle movable into selected openings of said series to hold the swing plate in selected positions of pivoted adjustment thereof, said toggle linkage extending from the end of the swing plate remote from the pivot axis thereof to said rock shaft, the rock shaft being spaced longitudinally of the frame from the pivot axis of the swing plate.

3. A swinging power saw comprising a support frame; a horizontally disposed work support table mounted upon said frame and having an elongated, slot-like blade passage; a sawing assembly carried by the frame including a swing plate pivotally mounted on the frame for swinging movement about a horizontal axis extending transversely of the frame, a motor mounted on said swing plate, a rotary saw blade journalled on the swing plate, said blade swinging with the swing plate between an extended position projecting through the blade passage and a retracted position below the table, and a driving connection between the motor and blade; a toggle linkage pivotally connected at one end to the swing plate; a rock shaft journalled in and extending transversely of the frame, said linkage being connected at its other end to said shaft and being adapted to swing the swing plate between blade-extending-and-retracting positions responsive to rocking of the shaft in respective opposite directions, the shaft projecting beyond one side of the frame; a fixed plate member rigid with the frame at said side thereof and having an arcuate series of openings curving about the axis of the shaft; a handle rigid with, and secured to the projecting end of the shaft for rocking the same; and a detent on the handle movable into selected openings of said series to hold the swing plate in selected positions of pivotal adjustment thereof, said toggle linkage extending from the end of the swing plate remote from the pivot axis thereof to said rock shaft, the rock shaft being spaced longitudinally of the frame from the pivot axis of the swing plate, said handle extending radially from the rock shaft and the fixed plate member lying in a plane normal to the axis of the rock shaft, the handle being shiftable in a plane closely spaced from and parallel to that of the fixed plate member.

References Cited in the file of this patent

UNITED STATES PATENTS

| 1,066,730 | Hughes | July 8, 1913 |
| 1,364,356 | DeKoning | Jan. 4, 1921 |
| 1,813,783 | Tomlinson et al. | July 7, 1931 |
| 2,208,582 | Hollister | July 23, 1940 |
| 2,505,958 | Grierson | May 2, 1950 |

FOREIGN PATENTS

| 432,993 | Germany | Aug. 30, 1926 |